(12) United States Patent
Han et al.

(10) Patent No.: US 10,108,545 B2
(45) Date of Patent: Oct. 23, 2018

(54) OPERATING SHINGLED MAGNETIC RECORDING DEVICE

(71) Applicant: EMC Corporation, Hopkinton, MA (US)

(72) Inventors: Geng Han, Beijing (CN); Jian Gao, Beijing (CN); Huibing Xiao, Beijing (CN); Jibing Dong, Beijing (CN); Lester Ming Zhang, Beijing (CN)

(73) Assignee: EMC IP Holding Company, Hopkinton, MA (US)

( * ) Notice: Subject to any disclaimer, the term of this patent is extended or adjusted under 35 U.S.C. 154(b) by 0 days.

(21) Appl. No.: 15/263,964

(22) Filed: Sep. 13, 2016

(65) Prior Publication Data

US 2017/0083438 A1 Mar. 23, 2017

(30) Foreign Application Priority Data

Sep. 17, 2015 (CN) .......................... 2015 1 0592027

(51) Int. Cl.
*G06F 12/02* (2006.01)
*G06F 3/06* (2006.01)

(52) U.S. Cl.
CPC .......... *G06F 12/0292* (2013.01); *G06F 3/064* (2013.01); *G06F 3/0626* (2013.01); *G06F 3/0659* (2013.01); *G06F 3/0665* (2013.01); *G06F 3/0676* (2013.01); *G06F 2212/1056* (2013.01); *G06F 2212/152* (2013.01)

(58) Field of Classification Search
CPC .... G06F 12/0292; G06F 3/0659; G06F 3/064; G06F 3/0665; G06F 3/0626; G06F 3/0676; G06F 2212/1056; G06F 2212/152
USPC ........................................................ 711/112
See application file for complete search history.

(56) References Cited

U.S. PATENT DOCUMENTS

| | | | |
|---|---|---|---|
| 2011/0099323 A1* | 4/2011 | Syu ..................... | G06F 12/0246 711/103 |
| 2013/0191601 A1* | 7/2013 | Peterson ............. | G06F 12/0868 711/137 |

\* cited by examiner

*Primary Examiner* — Jasmine Song
(74) *Attorney, Agent, or Firm* — Krishnendu Gupta; Robert Kevin Perkins

(57) ABSTRACT

The present application provides a method and apparatus of operating a shingled magnetic recording device that comprises a random access zone in which data is randomly readable and writable and a sequential access zone in which data is only sequentially readable and writable, and the sequential access zone is logically split into a plurality of banks operated independent of each other and storing a mapping from logical block addresses to physical block addresses in the random access zone; storing, in each bank of the plurality of banks in the sequential access zone, a respective part of a mapping from physical block addresses to logical block addresses; and operating the shingled magnetic recording device based on the mapping from logical block addresses to physical block addresses and the mapping from physical block addresses to logical block addresses.

18 Claims, 8 Drawing Sheets

OPERATING SHINGLED MAGNETIC RECORDING DEVICE

RELATED APPLICATION

This application claim priority from Chinese Patent Application Number CN201510592027.9, filed on Sep. 17, 2015 at the State Intellectual Property Office, China, titled "METHOD AND APPARATUS OF OPERATING SHINGLED MAGNETIC RECORDING DEVICE," the contents of which is herein incorporated by reference in entirety.

FIELD OF THE INVENTION

Embodiments of the present application relate to the technical field of computer storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

An objective of the embodiments of the present application is to provide an operation mechanism for an SMR device so as to overcome some of the current known problems in the prior art. According to one embodiment, there is provided a method of operating a shingled magnetic recording device, the device including a random access zone in which data is randomly readable and writable and a sequential access zone in which data is only sequentially readable and writable, the sequential access zone being logically split into a plurality of banks operated independent of each other, and the method including: storing a mapping from logical block addresses to physical block addresses in the random access zone; storing, in each of the plurality of banks in the sequential access zone, a respective part of a mapping from physical block addresses to logical block addresses; and operating the shingled magnetic recording device based on the mapping from logical block addresses to physical block addresses and the mapping from physical block addresses to logical block addresses.

BRIEF DESCRIPTION OF THE DRAWINGS

The drawings here are provided for further understanding of the present application, which constitutes part of the present application. The schematic embodiments of the present application and their explanations are used for explaining the present application, not constituting an improper limitation to the present application. In the accompanying drawings.

DETAILED DESCRIPTION

Figure 1:
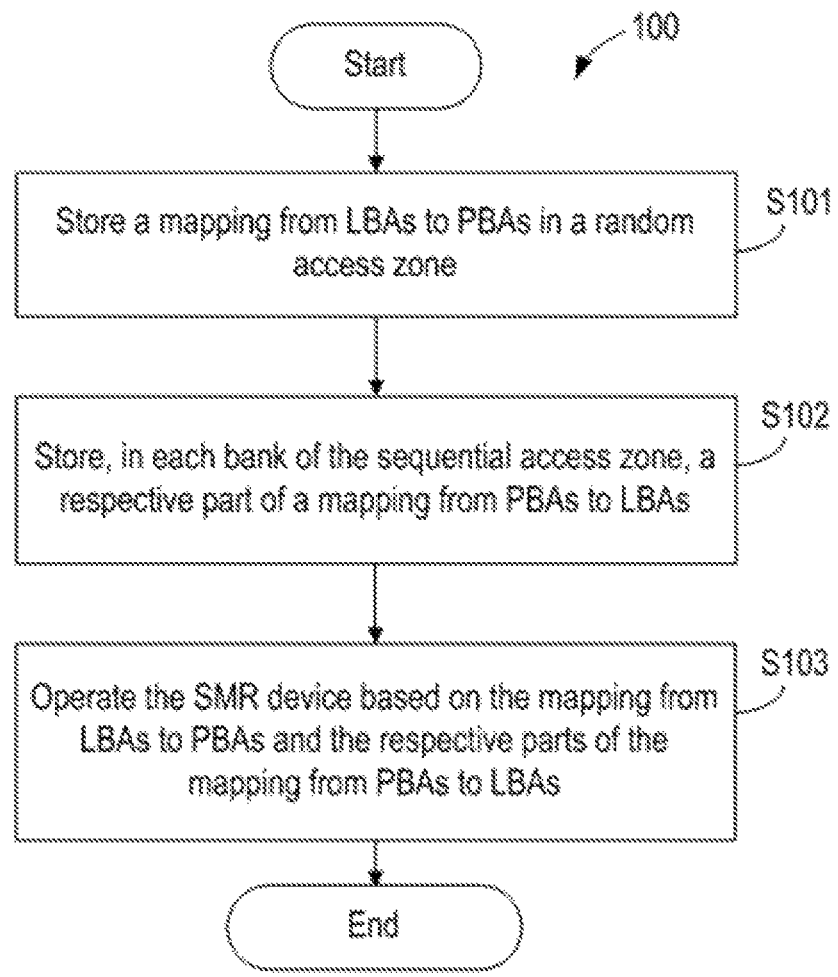
FIG. 1 shows a flow diagram of a method of operating an SMR device according to an exemplary embodiments of the present application.

Exemplary embodiments of the present application will be described in detail with reference to figures. The flowcharts and block diagrams in the figures illustrate system architecture, functions and operations executable by a method and system according to the embodiments of the present application. It should be appreciated that each block in the flowcharts or block diagrams may represent a module, a program segment, or a part of code, which contains one or more executable instructions for performing specified logic functions. It should also be noted that, in some alternative implementations, the functions noted in the block may occur out of the order noted in the figures. For example, two blocks shown consecutively may be performed in parallel substantially or in an inverse order, depending on involved functions. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

The terms "comprising", "including" and their variants used herein should be understood as open terms, i.e., "comprising/including, but not limited to". The term "based on" means "at least partly based on". The term "an embodiment" represents "at least one embodiment"; the terms "another embodiment" and "a further embodiment" represent "at least one additional embodiment". Relevant definitions of other terms will be given in the description below.

Generally, in the technical field of computer storage, PMR (Perpendicular Magnetic Recording) technology is used prevalently at present, because, PMR uses a parallel track layout. With an increasing demand on hard disk storage capacity in the current era of big data, arduous efforts now have been made to improve PMR storage capacity within inherent physical limitations of current recording mediums.

For example, storage capacity may be enhanced by increasing the number of tracks on a platter while correspondingly reducing a size of a write head. With an increase of areal density of tracks on the platter, the size of a bit on the medium is decreased. In order to maintain sufficient signal-to-noise ratio (SNR) to facilitate reading, manufacturers have to decrease a grain size on the medium. Further, decrease of a volume of the material for holding the bit results in decrease of an energy barrier for flipping the bit. A lower energy barrier signifies a larger possibility of flipping the bit by an ambient thermal energy, leading to reduction of data integrity.

In order to enhance energy barrier, coercivity of the material may be increased so as to mitigate the risk of flipped magnetization. However, this becomes an issue as manufacturers attempt to reduce the size of the write head for making more tracks on a platter, because a smaller write head means an even smaller writing area (correspondingly, a smaller coercivity), while a smaller write area will become increasingly insufficient to change magnetization on a medium, preventing a write from occurring.

In some embodiments, a novel hard disk drive technology, i.e., shingled magnetic recording (SMR), may be used. In some other embodiments, different from a parallel track layout in PMR, a SMR may allow tracks on a platter to be layered on top of each other, just like roof shingles on a house, thereby increasing platter density or tracks per inch (TPI). In some other embodiments, by increasing TPI with a SMR technology and decreasing a spacing between tracks, which may make it unnecessary to reduce write head, SMR offers a tremendous potential for overall hard disk drive capacity gains. In some other embodiments, in actuality, in an SMR drive, a write head may be intentionally made larger, because a larger write head means a capability of more effective magnetization of the medium (i.e., write), without a need of compromising readability or stability (retention). In some other embodiments, however, in such an SMR layout, a write head may be wider than an individual track; therefore, writing data onto an SMR hard disk has to be done sequentially in case a write head may destroy data on overlapping tracks. In some embodiments, it should be understood that it may be impossible to restrict an operating system and a file system to only writing sequentially onto a hard disk, because in general, an operating system and a file system need a random access operation for a hard disk, and it may be desirable to create a management or translation mechanism for an SMR device to translate a random access to a sequential access.

One embodiment may include an operation mechanism for an SMR device to overcome some of the current known problems in the prior art. One embodiment may include a method of operating a shingled magnetic recording device, wherein the device including a random access zone in which data may be randomly readable and writable and a sequential access zone in which data is only sequentially readable and writable, the sequential access zone being logically split into a plurality of banks operated independent of each other. In a further embodiment, the method may include storing a mapping from logical block addresses to physical block addresses in the random access zone. A further embodiment may include storing, in each of a plurality of banks in a sequential access zone, a respective part of a mapping from physical block addresses to logical block addresses. Yet a further embodiment may include operating a shingled magnetic recording device based on a mapping from logical block addresses to physical block addresses and a mapping from physical block addresses to logical block addresses.

One embodiment may include an apparatus of operating a shingled magnetic recording device, wherein the device including a random access zone in which data may be randomly readable and writable and a sequential access zone in which data is only sequentially readable and writable, the sequential access zone being logically split into a plurality of banks operated independent of each other. In a further embodiment the apparatus may include a first storage control module configured to store a mapping from logical block addresses to physical block addresses in a random access zone. A further embodiment may include a second storage control module configured to store, in each of a plurality of banks in a sequential access zone, a respective part of a mapping from physical block addresses to logical block addresses. Yet a further embodiment may include an operating module configured to operate a shingled magnetic recording device based on a mapping from logical block addresses to physical block addresses and a mapping from physical block addresses to logical block addresses.

According to some embodiments, an operating or driving mechanism for an SMR device may be provided, such that a random access operation that cannot be directly supported by a SMR device may be supported, thereby enabling a backward compatibility of an SMR device with an operating system or a file system, further facilitating a user to use.

In some embodiment, as mentioned above, a novel shingled track layout dramatically increases platter density or TPI, as well as a drive capacity as a whole. In some other embodiments, with this novel architecture, in-place substitution may destroy data written previously. In some other embodiments, a logical block address (LBA) translation layer for an SMR device may be introduced to reorder logically random access into physically sequential write.

In some embodiments, similar to a flash translation layer (FTL) of a solid state disk SSD, an SMR device may use an SMR (or shingled) translation layer (STL). Due to different STL locations, there may be the following three types of SMR devices.

1. Drive Managed Type

In some embodiments, a first type is known as drive managed, also known as transparent. In certain embodiments, a SMR device may manage all requests from a host, like a traditional HDD. In certain other embodiments, a drive managed may have an advantage of not requiring a host to be SMR aware, and a drive managed SMR device may be compatible with nearly all systems. In certain other embodiments, a downside of a drive managed may be it's unpredictable performance as a drive handles its background processes where necessary, regardless of IO requests. In certain additional embodiments, because inbound random writes may not be coalesced into sequential writes at a host side, a drive bears more duress than an SMR-aware host, such that execution of sustained workloads may be dampened. In certain other embodiments, a drive managed SMR device may handle these downsides using various kinds of "landing zones." In certain other embodiments, in a landing zone, random writes may be managed before being written into a disk. In certain other embodiments, ways of incorporating a landing zone on an SMR device may vary widely, but leading to significantly different performance profiles depending on target markets of individual SMR devices and manufacturers.

2. Host Managed Type

In certain embodiments, a second type may be known as host managed. In some embodiments, with this type of host managed, a host may optimize behaviors of an SMR device by managing IOs using commands and zone information, thereby ensuring that writes in a zone may be constantly sequential. In some other embodiments, if a host sends a non-sequential write in a zone, an SMR device may reject it and return an error. In some other embodiments, this offers a higher predictability to an SMR device and may be more likely to be seen initially in enterprise and hyper-scale applications. In some other embodiments, a downside of the host managed may be that an SMR device is incompatible with host systems that may not be SMR aware (e.g., a device driver, a file system, a database, etc.). In some other embodiments, this means a need of adapting a host system such as a file system to support an SMR device. In some other embodiments, this may occur first in a hyper-scale space where the largest players in the world have an ability to modify their storage stacks to account for SMR, and now also in a mainstream open source space.

3. Host Aware Type

In some embodiments, the last type may be known as host aware. In some other embodiments, in general, host aware may be a combination of two managed types above. In some other embodiments, an SMR device may be self-managed, but may also allow optimization of the behaviors of the SMR device. In some other embodiments, if an SMR device receives a non-sequential write from a host, it may accept the request; but afterwards, performance from a request may become unpredictable. In some other embodiments, a host aware has an advantage of backward compatibility and gives the host some control.

In some embodiments, a mechanism for operating an SMR device may be applicable to any one of the above three cases. In some other embodiments, a mechanism for operating an SMR device may be applicable in an implementation for an SMR device integrated with an SMR translation layer STL, and may also be used in a host system so as to cooperate with a host system to handle and use an SMR device.

In certain embodiments, to make the objective, technical solution, and advantages of the present application much clearer, the present application will be described in further detail with reference to the accompanying drawings and embodiments. In the context of the embodiments of the present application, suppose all SMR devices support the following features:

1. Providing two types of zones: random access zone and sequential access zone. In some embodiments, a random access zone is a parallel track layout, like a traditional PMR, where data may be randomly accessed, i.e., in-place update enabled. In some other embodiments, a sequential access zone is a shingled track layout, where data can only be sequentially accessed.

2. The sequential access zone may be logically split into a plurality of banks. In some embodiments, gaps should exist between these banks. In some other embodiments, updating data for one bank may not corrupt data on other banks.

With suppositions made above, an underlying mechanism for operating an SMR device according to the embodiments of the present application will be described hereinafter with reference to FIG. 1. FIG. 1 shows a flow diagram of a method 100 of operating an SMR device according to an exemplary embodiment of the present application. As shown in FIG. 1, in step S101, a mapping from LBAs (logical block addresses) to PBAs (physical block addresses) is stored in a random access zone. In step S102, a respective part of a mapping from PBAs to LBAs is stored in each bank of the sequential access zone. in step S103, the SMR device is operated based on the mapping from LBAs to PBAs and the mapping from PBAs to LBAs.

In some embodiments, a logical block address LBA may be included in a data access request for an SMR device, e.g., a data read/write request. In some other embodiments, an LBA may represent a logical address of random access data. In some other embodiments, a physical block address may correspond to a physical address of data storage in the SMR device. A certain embodiment, lies in centrally saving a mapping from LBAs to PBAs in the random access zone.

In one embodiment, an LBA of each logical block may be used as an index to check the mapping so as to obtain a corresponding PBA. In some embodiments, considering that both PBA and LBA are 64-bit and a mapping from LBAs to PBAs may be recorded at a block level, the mapping will occupy a 4 GB space for 1 TB user data. In some other embodiments, in order to speed up access to a mapping from LBAs to PBAs, the mapping from LBAs to PBAs may be stored in a buffer for the random access zone. In an example embodiment, a cache may be provided for a random access zone to store a mapping from LBAs to PBAs. In some embodiments, this way the speed of accessing a mapping from LBAs to PBAs may be accelerated. In some other embodiments, any existing or future developed other buffers of any appropriate type may also be used for storing a mapping from LBAs to PBAs.

In step S102, a respective part of a mapping from PBAs to LBAs is stored in each bank of the sequential access zone. In some embodiments, in a sequential access zone, a mapping from PBAs to LBAs may be scattered in respective banks. In one embodiment, in each bank of a sequential access zone, a respective part of a mapping from PBAs to LBAs corresponding to a physical address of a bank is stored, respectively.

Based on the storing operations in steps S101 and S102 above, various operations to the SMR device may be implemented. As shown in FIG. 1, in step S103, the SMR device is operated based on the mapping from LBAs to PBAs and the mapping from PBAs to LBAs. In one embodiment, a data access operation may be performed to an SMR device, e.g., data write/read. In one embodiment, a management operation may be performed for an SMR device, e.g., disk space defragment (garbage collection), system recovery, etc., which will be described later in more detail.

In some embodiments, in general, organization of disk space of an SMR device may be central, i.e., how to use a random access zone and a sequential access zone of an SMR device. In some other embodiments, as mentioned previously, a mapping from LBAs to PBAs may be centrally saved in a random access zone, while in a sequential access zone, a mapping from PBAs to LBAs may be scattered in respective banks. In some embodiments, organization manner indicated above intends to support a random access operation for an SMR device so as to achieve compatibility of the SMR device with a host system or a file system, and will be described in more detail with reference to FIGS. 2-7.

Figure 2:
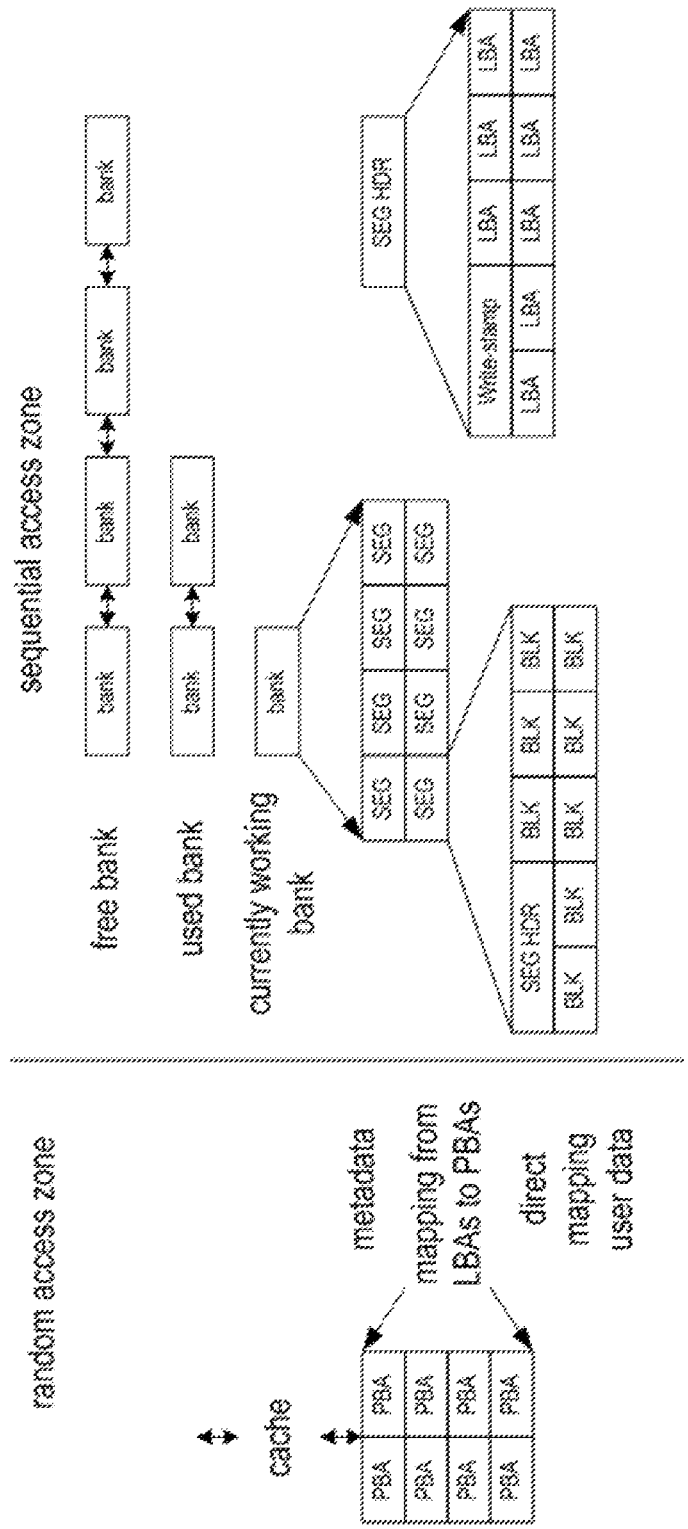
FIG. 2 shows a schematic diagram of an SMR drive layout architecture for operating an SMR device according to an exemplary embodiments of the present application.

FIG. 2 shows a schematic diagram of a SMR drive layout architecture for operating an SMR device according to an exemplary embodiment of the present application.

1. Random Access Zone

According to embodiments of the present application, for a TB drive capacity, the random access zone should be in the order of GB. As mentioned above, in one embodiment, a mapping from LBAs to PBAs may be stored in a random access zone. Besides, in one embodiment, metadata for SMR device operation (SMR drive translation layer) may also be stored in a random access zone. In one embodiment, metadata may at least include one or more of the following: free bank list, used bank list, a plurality of counters maintained for each bank respectively, next available segment in a current working bank, and persisted write-stamp, etc. In one embodiment, user data that are predicted to be frequently modified may also be directly stored in the random access zone. In an example embodiment, some user data that are predicted to be modified frequently (e.g., a file that is currently being edited, etc.) may be stored in remaining space in a random access zone except a space for storing a mapping from LBAs to PBAs and a metadata. In an example embodiment, if it is known in advance that data in a specific LBA range will be frequently modified, such data may be saved in a direct mapping area of the random access zone. In one embodiment, this approach may greatly reduce fragmentations in a sequential access zone and facilitates management of an SMR device. In some embodiments, however, because a resource of a direct mapping area is limited, the user needs to make a compromise on deciding which part of data is put into the area.

2. Sequential Access Zone

According to the embodiments of the present application, space of a sequential access zone may be split in hierarchy, wherein each of a plurality of banks may be split into a plurality of segments, while each segment includes a segment header and a plurality of blocks, the segment header including a respective part of a mapping from PBAs to LBAs, each of the plurality of blocks being used as a minimum unit for data read/write. To facilitate understanding, the terms therein will be described below with reference to FIG. 2:

(1) Zone (ZN)

In some embodiments, there may be two types of zones: random access zone and sequential access zone. In some other embodiments, a random access zone may store the mapping from LBAs to PBAs, metadata, and direct mapping user data. In some other embodiments, a sequential access zone may store other user data as well as the mapping from PBAs to LBAs. In some other embodiments, the two zones may occupy any appropriate percentages, e.g., if the random access zone occupies 1%, the sequential access zone will occupy 99%. As mentioned above, in some embodiments, under a TB-order drive capacity, a random access zone may at least be in the order of GB, and a sequential access zone may usually be in the order of TB.

(2) Bank (BK)

In some embodiments, a sequential access zone may be logically split into a plurality of banks. In some other embodiments, these banks may be operated independent of each other. In some other embodiments, access operation on one bank may not affect another bank; and random operation may be performed on the bank level. In an additional embodiment, garbage collection processing may be performed on the bank level. In some embodiments, a size of the bank may be in the order of GB. In an example embodiment, the size of a bank may be 1 GB.

(3) Segment (SEG)

In some embodiments, each bank may be composed of a plurality of segments. In some other embodiments, a segment size may be in the order of MB. According to one embodiment, the segment size may be 4 MB. According to embodiments of the present application, each segment may include a segment header SEG HDR and a plurality of blocks BLK. In some embodiments, each segment is headed with SEG HDR. In some other embodiments, a mapping from PBAs to LBAs may be tracked according to the segment header. According to some other embodiments, a respective part of a mapping from PBAs to LBAs may be stored in a SEG HDR. According to some other embodiments, in a SEG HDR may also store a write-stamp (Writestamp). In some other embodiments, a write-stamp is a timestamp for recording the time if the current segment is subjected to a write operation.

(4) Block (BLK)

In some embodiments, a block is a minimum unit for data read/write access. In some other embodiments, sizes of all mentioned zones, banks, segments, and segment headers may be based on block size. According to one embodiment, a size of block is 4 k.

It is seen from the sequential access zone of FIG. 2 that according to the embodiments of the present application, a series of banks in a sequential access zone may be managed according to usages. In an example embodiment, banks may be divided into free banks, used banks, and currently working banks. In one embodiment, corresponding free bank list, used bank list, and next segment in the currently working bank and like information may be stored in the random access zone, so as to perform access operations and processing for these banks.

Hereinafter, various processing procedures for operating an SMR device according to the embodiments of the present application will be described with reference to FIGS. 3-7, including write operation, read operation, garbage collection processing, system recovery, etc.

Figure 3:
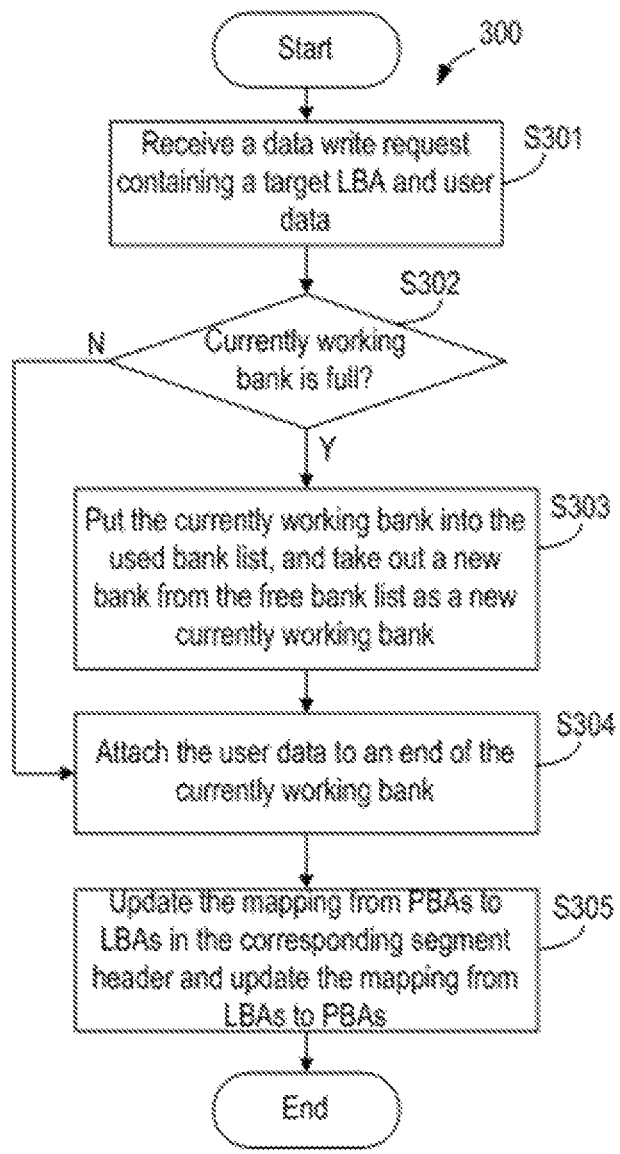
FIG. 3 shows a processing flow diagram of a write operation for an SMR device according to an exemplary embodiments of the present application.

FIG. 3 shows a processing flow diagram of a write operation 300 for an SMR device according to an exemplary embodiment of the present application. As shown in FIG. 3, in step S301, a data write request including a target LBA and user data is received. In step S302, it is determined whether the currently working bank is full. In response to the currently working bank being full, the processing enters step S303 to put the currently working bank in the used bank list, and take out a new bank from the free bank list as a new currently working bank. In step S304, the user data is attached to an end of the currently working bank. In step S305, the mapping from LBAs to PBAs and the respective part of the mapping from PBAs to LBAs are updated.

In one embodiment, a data write request from a host system may be received. In another embodiment, a request may include a target LBA and user data intended to be written. In another embodiment, a target LBA may be an individual LBA or an LBA range.

In response to receiving such a data write request, next in step S302, it is determined whether the currently working bank is full. According to one embodiment, a bank buffer may be provided for the currently working bank, and a segment buffer may be provided for a current segment in the currently working bank. In one embodiment, for determining whether a currently working bank is full, it may be first determined whether a segment buffer is full. In another embodiment, if a segment buffer is not full, it is determined that the currently working bank is not full. In another embodiment, if a segment buffer is full, a current segment may be persisted on the disk (written into the disk), and then it is determined whether the bank buffer is full. In another embodiment, if the bank buffer is full, it may be determined that the currently working bank is full. In another embodiment, if the bank buffer is not full, it may be determined that the currently working bank is not full.

In response to the currently working bank being full, processing enters step S303 to put the currently working bank in the used bank list, and take out a new bank from the free bank list as a new currently working bank. Following the example above, according to one embodiment, if the bank buffer is full, the bank may be put into the used bank list, e.g., a bank may be marked as used in a metadata and an entire bank may be moved into a used bank list; then, a new bank may be allocated from a free bank list to a bank buffer, and a first segment of the new bank is allocated to the segment buffer.

Then, in step S304, the user data is attached to an end of the currently working bank. Following the example above, according to one embodiment, a user data may be attached to an end of a segment buffer. Back to step S302, if it is determined in step S302 that the currently working bank is not full, the processing enters step S304 above. Following the example above, in one embodiment, if the segment buffer is not full, the user data may be attached to an end of the segment buffer. In another embodiment, if the segment buffer is full while the bank buffer may not be full, a current segment may be persisted to a disk, and a next segment in a currently working bank may be allocated to a segment buffer, and then a user data may be attached to the end of a segment buffer.

Next, in step S305, a mapping from LBAs to PBAs and the respective part of the mapping from PBAs to LBAs are updated. In one embodiment, while updating a mapping from LBAs to PBAs in the random access zone, the mapping from PBAs to LBAs in a corresponding segment header SEG HDR may be updated. In other embodiments, update of both may be performed in any sequence. Processing of a write operation for an SMR device according to the embodiments of the present application has been exemplarily described above with reference to FIG. 3. Hereinafter, processing of a read operation for an SMR device according to embodiments of the present application will be described with reference to FIG. 4.

Figure 4:
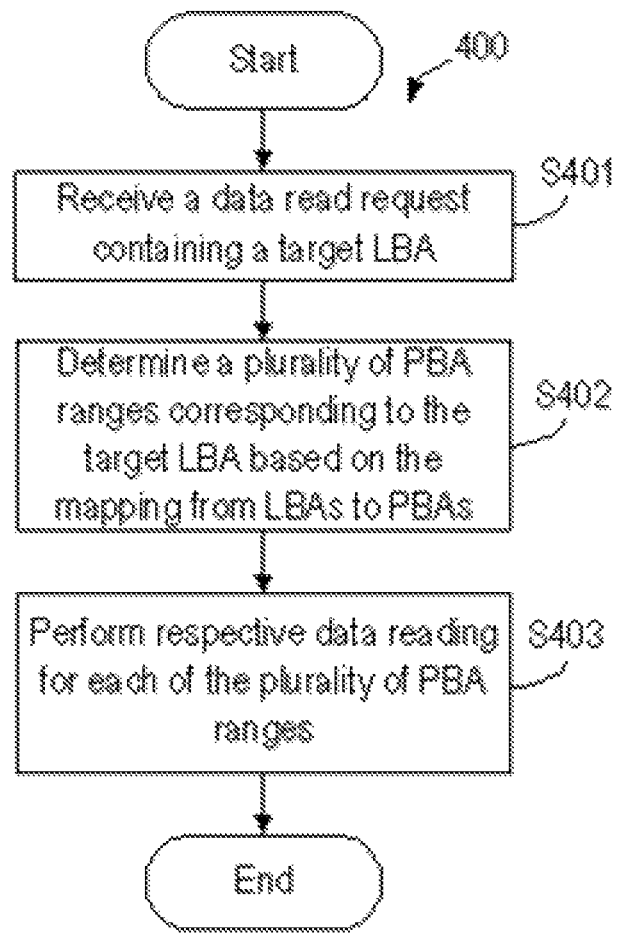
FIG. 4 shows a processing flow diagram of a read operation for an SMR device according to an exemplary embodiments of the present application.

FIG. 4 shows a processing flow diagram of a read operation 400 for an SMR device according to the embodiments of the present application. As shown in FIG. 4, in step S401, a data read request including a target LBA is received. In step S402, a plurality of PBA ranges corresponding to the target LBA are determined based on the mapping from LBAs to PBAs. In step S403, a respective data reading is performed based on each of the plurality of physical block address ranges.

In one embodiment, a data read request from a host system may be received. In another embodiment, a request may include a target LBA corresponding to data intended to read. In another embodiment, a target LBA may be an individual LBA or an LBA range.

In response to receiving such a data request, next in step S402, a plurality of PBA ranges corresponding to the target LBA are determined based on the mapping from LBAs to PBAs. According to one embodiment, in response to receiving a data read request for an SMR device, one or more PBA mapping results corresponding to a target LBA are found from the mapping from LBAs to PBAs with a target LBA as an index. In another embodiment, a target LBA may be an individual LBA or a continuous LBA range; however, a corresponding PBA is very likely discontinuous; therefore, a target LBA may correspond to one or more PBA ranges.

After determining a plurality of PBA ranges corresponding to a target LBA, the processing enters step S403, where a respective data reading is performed based on each of the plurality of physical block address ranges. According to one embodiment, a data read request may be split into data read sub-requests corresponding to each range of a plurality of PBA ranges, such that processing is done for each data read sub-request one by one. In another embodiment, after all sub-requests are done, processing of the original read request is done. In one embodiment, for each PBA range, it may be first checked whether data in a requested PBA range exist in a currently working segment buffer. In one embodiment, in case of existence, data may be copied from a segment buffer so as to be outputted as a response to a data read request. In one embodiment, in case of absence, a data read request may be issued to a disk to obtain corresponding data for output.

Data access operation for an SMR device according to the embodiments of the present application has been exemplarily described above with reference to FIGS. 3 and 4. It should be understood that in order to better support the data access operation, disk space defragment for the SMR device is essential. Hereinafter, the process of a garbage collection operation for an SMR device according to embodiments of the present application will be exemplarily described with reference to FIGS. 5 and 6.

According to embodiments of the present application, a garbage collection operation may be carried out on a bank level. In some embodiments, this involves an issue of which banks are collected to obtain more free space. In some other embodiments, it may be contemplated that a counter (also referred to as a bank messy counter) may be maintained for each bank, and if blocks in a bank are modified, a counter corresponding to the bank increments. In some other embodiments, a counter with a larger value indicates that a corresponding bank may contain more invalid or obsolete user data, and those banks having a larger counter value may be collected for recycle.

Figure 5:
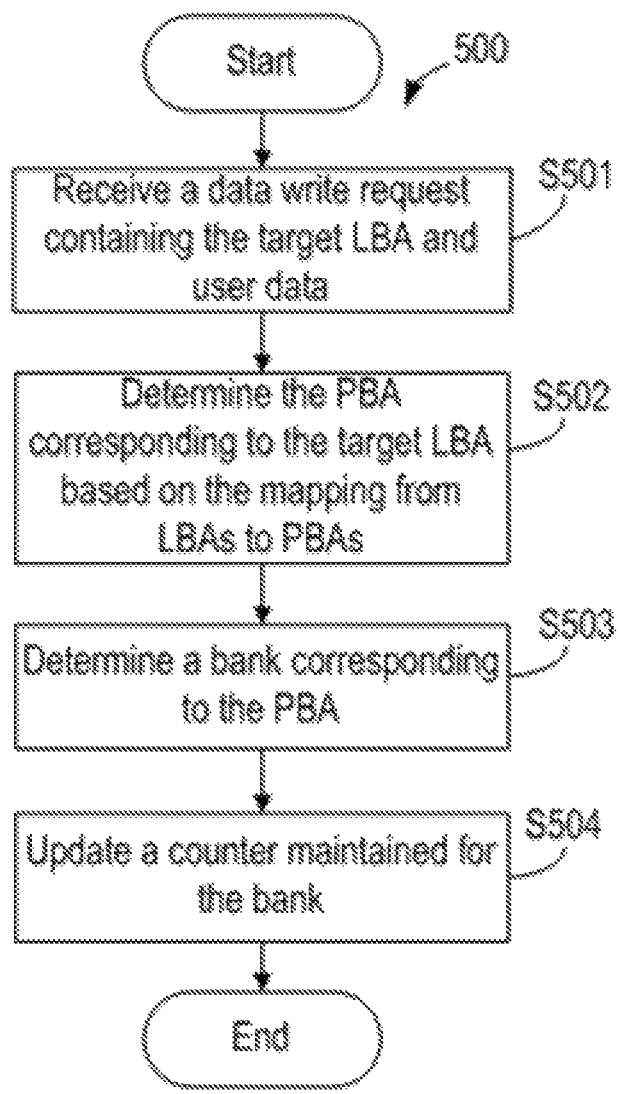
FIG. 5 shows a processing flow diagram of an operation of updating a counter maintained for a bank in an SMR device according to an exemplary embodiments of the present application.

FIG. 5 shows a processing flow diagram of an operation 500 of updating a counter maintained for a bank in an SMR device according to an exemplary embodiment of the present application. As shown in FIG. 5, in step S501, a data write request including a target LBA and user data is received. In response to receiving the data write request, the processing may enter step S502 to determine a PBA corresponding to the target LBA based on the mapping from LBAs to PBAs stored in the random access zone. After an original PBA corresponding to the target LBA is determined from the original mapping from LBAs to PBAs stored in the random access zone, in step S503, a bank corresponding to the PBA is determined. Then, in step S504, a counter maintained for the bank determined at step S503 is updated. In one embodiment, for each of one or more banks determined at step S503, their respective counters may increment.

In some embodiment, because modification to blocks in a bank may involve only if data is written, updating operation of the bank messy counter may be performed in response to a data write request. In some other embodiments, step 501 may be consistent with the processing of step S301 described previously with reference to FIG. 3, which will not be detailed here. As mentioned in an embodiment above, mapping from LBAs to PBAs may be stored in a cache so as to speed up the LBAs to PBAs lookup and updating operations. In one embodiment, because a mapping from LBAs to PBAs may be updated later, the mapping result may be attached into a system memory using a cache module, until the mapping from LBAs to PBAs is updated later. In one embodiment, a determined PBA may be single or one or more PBA ranges. In one embodiment, a determined bank may be one bank or a plurality of banks. In one embodiment, a value of a counter represents a messy degree of a bank. In another embodiment, higher the value, more invalid user data may be included in the bank.

Figure 6:
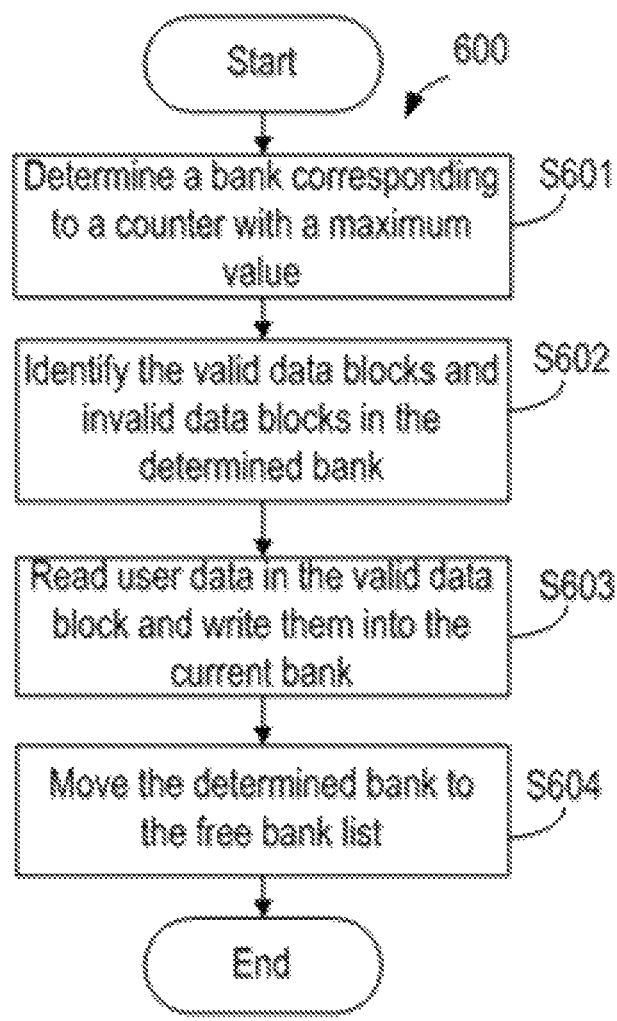
FIG. 6 shows a processing flow diagram of a garbage collection operation for an SMR device according to an exemplary embodiments of the present application.

What has been described above with reference to FIG. 5 is how to determine a messy degree of a bank. Hereinafter, FIG. 6 will be referenced to describe how to perform collection processing to a bank based on the messy degree of the bank. FIG. 6 shows a processing flow diagram of a garbage collection operation 600 for an SMR device according to an exemplary embodiment of the present application.

As shown in FIG. 6, in step S601, a bank corresponding to a counter with a maximum value is determined. In step S602, valid data blocks and invalid data blocks in the determined bank are identified. After the valid data blocks and invalid data blocks in the to-be-collected bank are identified, the processing enters step S603 to read user data in the valid data blocks and rewrite the user data into the current bank. The write operation here is similar to the processing described above with reference to FIG. 3, which will not be detailed here. Then, in step S604, the determined to-be-collected bank is moved into the free bank list. For example, the to-be-collected bank may be moved into the free bank list and marked as free.

According to the embodiments of the present application, steps S601-S604 of the collection processing above may be performed repetitively within a predetermined time or according to a predetermined interval, so as to ensure that the disk space of an SMR device is constantly utilized to the maximal, and meanwhile data access operation for the SMR device may be accelerated. According to embodiments of the present application, a bank with a maximum counter value may be determined as a to-be-collected bank. In one embodiment, it may be appreciated that a bank with a maximum counter value contains most invalid user data. In another embodiment, a bank may also contain valid user data. In another embodiment, this may involve identifying a block that contains valid user data and a block that contains invalid user data.

In one embodiment, as mentioned above, a mapping from LBAs to PBAs may be centrally saved in a random access zone, which facilitates an operation of looking up a mapping from LBAs to PBAs. In another embodiment, a mapping from PBAs to LBAs may be scattered in each segment header. According to one embodiment, after blocks are updated, a mapping from PBAs to LBAs in a segment header associated with a new PBA having a updated user data may be updated besides a mapping from LBAs to PBAs in a random access zone, but a mapping from PBAs to LBAs in a segment header associated with an old PBA containing old user data will not be updated. In another embodiment, if an LBA and PBA recorded in a segment header are different from an LBA and PBA recorded in a mapping from LBAs to PBAs in a random access zone, it indicates that a block in a corresponding segment has invalid user data. One embodiment of the present application is identifying whether a data block is valid or invalid by comparing an LBA and PBA recorded in a segment header with the LBA and PBA recorded in the mapping from LBAs to PBAs in a random access zone, thereby completing the bank collection processing.

According to one embodiment, valid data blocks and invalid data blocks in a to-be-collected bank may be identified through the following step:
reading segment headers of respective segments included in a determined to-be-collected bank;
translating a mapping from PBAs to LBAs in a segment headers into respective mapping from LBAs to PBAs (version 1), respectively;
comparing the mapping from LBAs to PBAs (version 1) translated for the segment header with the mapping from LBAs to PBAs (version 2) in a random access zone; and
if version 1 is identical to version 2, blocks in segments corresponding to the segment headers are identified as valid data blocks; otherwise, blocks in segments corresponding to the segment headers are identified as invalid data block.

In some embodiments, till now, processing procedures of a data access operation and garbage collection operation for an SMR data have been described with reference to FIGS. 2-6. In some other embodiments, it may be seen from processing of a data access operation and garbage collection operation for an SMR device that an access to a mapping from LBAs to PBAs may be a crucial approach for performing data read/write and garbage collection. In particular, access to the mapping from LBAs to PBAs has a significant impact on the final IO performance. In an addition embodiment, a garbage collection processing may identify whether a block contains valid user data or invalid user data using a mapping from LBAs to PBAs. Thus, according to some embodiments, a buffer may be provided to save a mapping from LBAs to PBAs, thereby enhancing a mapping access performance. In some other embodiments, however, content in a buffer might be lost upon system crash or power failure, which may bring about an issue of recovering a mapping from LBAs to PBAs.

In one embodiment, to address this issue, a buffer working in a write-through mode may be simply implemented, or a persisted memory is used for the buffer. In another embodiment, a downside of a write-through mode may lie in a poor mapping update performance. In another embodiment, a persisted memory in a system is a limited resource; then increased use of a persisted memory means increase of a total cost of a system. One embodiments of the present application lies in that a mapping from LBAs to PBAs in a random access zone may be recovered based on a mapping from PBAs to LBAs stored in a sequential access zone in case of system crash or power off.

According to one embodiment, based on write-stamps in a segment headers in a sequential access zone and a persisted write-stamp in a metadata, a mapping from PBAs to LBAs included in respective segment headers corresponding to a write-stamps larger than a persisted write-stamp may be obtained, and then based on the obtained mapping from PBAs to LBAs, a mapping from LBAs to PBAs in a random access zone may be recovered.

Specifically, in one embodiments, a write-stamp (timestamp) may be maintained in each segment header, for recording the time of write operation for the segment. In another embodiment, the write-stamp may increase monotonically. In another embodiment, a write-stamp (timestamp) may be maintained for each dirty mapping LBA range in a buffer. In another embodiment, after persisting a dirty mapping LBA range (usually by a background flushing process) to a disk, it may be needed to check whether all dirty mapping LBA ranges having a write-stamp smaller than a write-stamp that has been persisted to the disk. In another embodiment, if yes, a write-stamp may be persisted to the metadata; in this case, the write-stamp may also be referred to as a persisted write-stamp. In another embodiment, a write-stamp (persisted write-stamp) in the metadata represents all changes of a mapping from LBAs to PBAs before having been persisted to a disk. In another embodiment, after a system recovers from power failure or crash, write-stamp in the metadata may be obtained, and then all segments with a write-stamp in their segment headers greater than the write-stamp in the metadata may be found out, and a mapping from LBAs to PBAs may be recovered using the mapping from PBAs to LBAs recorded in these segment headers. Hereinafter, this will be described in more detail with reference to FIG. 7.

Figure 7:
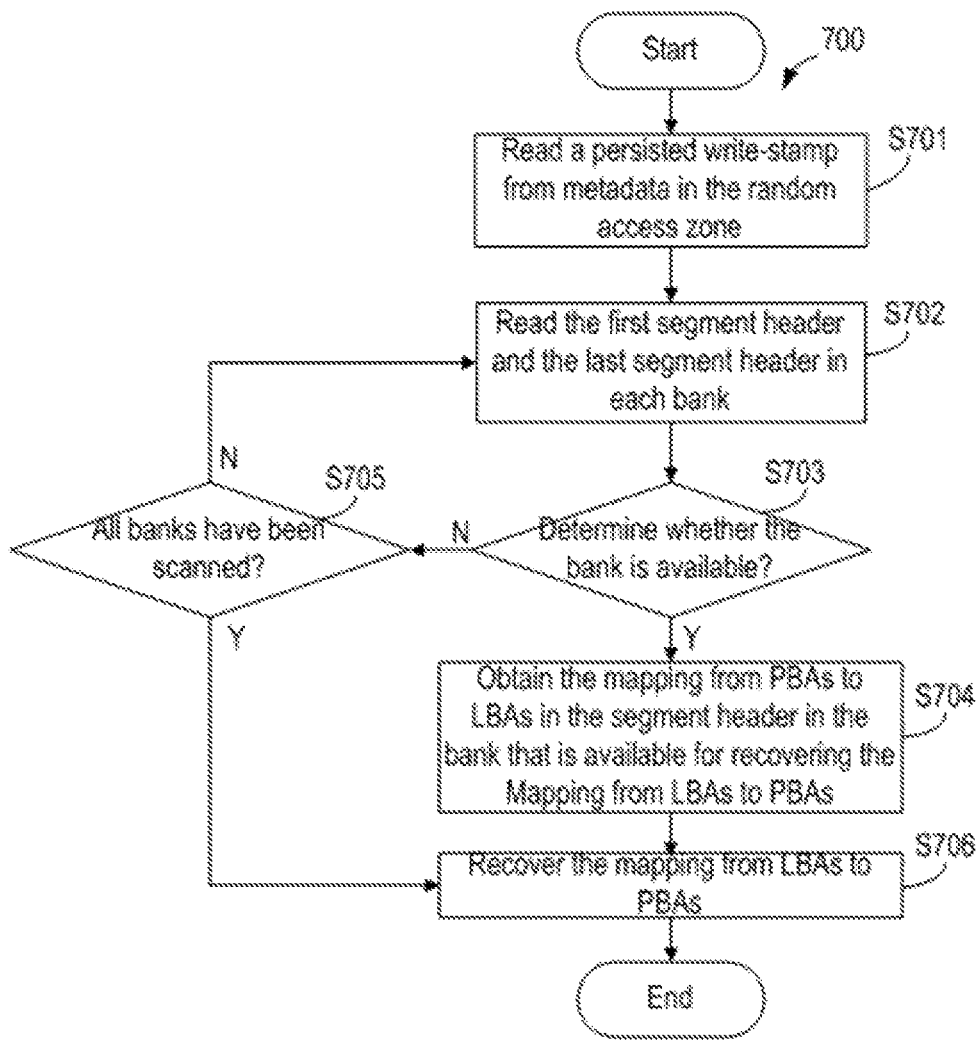
FIG. 7 shows a processing flow diagram of an LBAs-to-PBAs mapping recovery operation for an SMR device according to an exemplary embodiments of the present application.

FIG. 7 shows a processing flow diagram of an LBA-to-PBA mapping recovery operation 700 for an SMR device according to the embodiments of the present application.

As shown in FIG. 7, in step S701, a persisted write-stamp is read from metadata in a random access zone. In step S702, a first segment header and a last segment header in each bank are read. In step S703, it is determined whether the bank is available. In the embodiments of the present application, for each bank, the first segment header and the last segment header may be read, respectively, and then it is determined whether the bank may be available for recovering the mapping from LBAs to PBAs based on whether the write-stamps therein are lower than the write-stamp in the metadata. If the bank is determined available in step S703, the processing enters step S704 to obtain the mapping from PBAs to LBAs in the segment headers in the bank. If the banker is determined unavailable in step S703, the bank is skipped, and the processing enters step S705 to determine whether to scan all banks. If no, steps S702 to S705 are performed for the next bank, till obtaining all of the mapping from PBAs to LBAs in the segment headers in the bank that may be available for recovering the mapping from LBAs to PBAs. Next, the processing enters step S706 to recover the mapping from LBAs to PBAs based on the obtained mapping from PBAs to LBAs.

In one embodiment, in order to find out a segment having a write-stamp larger than a write-stamp in the metadata, it may not be needed to scan all segment headers in the disk. In another embodiment, in order to optimize this procedure, it may only be needed to read a first segment header and a last segment header in each bank. In another embodiment, if write-stamps therein are both lower than a write-stamp in the metadata, a bank may be skipped, and in this way, all banks of interest may be quickly found out. In another embodiment, if write-stamps therein are both lower than a write-stamp in the metadata, it may be determined that a bank cannot be available for recovering a mapping from LBAs to PBAs; otherwise, it may be determined that a bank may be available for recovering a mapping from LBAs to PBAs.

Based on the recovery operation of the mapping from LBAs to PBAs described above with reference to FIG. 7, the mapping from LBAs to PBAs may be quickly recovered upon power failure or system crash, thereby ensuring consistency and correctness of the mapping. Till now, a method of operating an SMR device according to the embodiments of the present application has been described above with reference to FIGS. 1-7. Similar to the method, embodiments of the present application further provide an apparatus of operating an SMR device.

Figure 8:
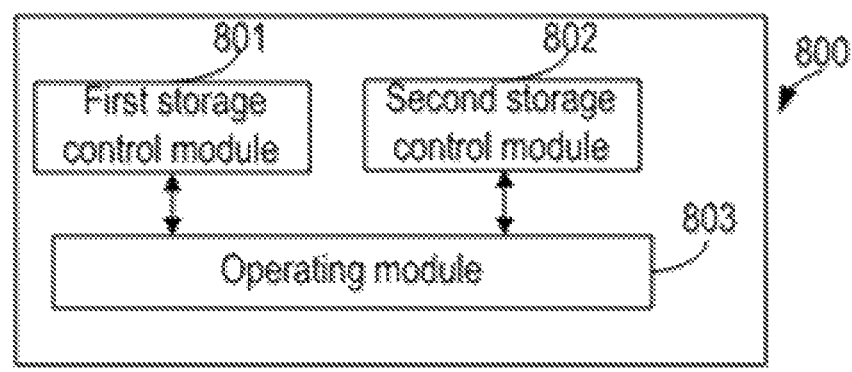
FIG. 8 shows a schematic block diagram of an apparatus for operating an SMR device according to an exemplary embodiments of the present application.

FIG. 8 shows a schematic block diagram of an apparatus 800 of operating an SMR device according to an exemplary embodiment of the present application. In the embodiments of the present application, the apparatus may be implemented in a host system or integrated with the SMR device. As mentioned above, an SMR device may comprise a random access zone in which data is randomly readable and writable and a sequential access zone in which data is only sequentially readable and writable; in addition, the sequential access zone may be logically split into a plurality of banks that are operated independent of each other.

As shown in FIG. 8, apparatus 800 may comprise first storage control module 801, second storage control module 802, and operating module 803.

In one embodiment of the present application, first storage control module 801 may be configured to store a mapping from logical block addresses to physical block addresses in the random access zone. Second storage control module 802 may be configured to store, in each of the plurality of banks in the sequential access zone, a respective part of a mapping from physical block addresses to logical block addresses. Operating module 803 may be configured to operate the shingled magnetic recording device based on the mapping from logical block addresses to physical block addresses and the mapping from physical block addresses to logical block addresses.

According to embodiments of the present application, first storage control module 801 may be further configured to store metadata in the random access zone, the metadata at least including one or more of the following: free bank list, used bank list, a plurality of counters maintained for each bank respectively, next available segment in a current working bank, and persisted write-stamp. According to embodiments of the present application, first storage control module 801 may be further configured to directly store user data that may be predicted to be frequently modified in the random access zone.

According to embodiments of the present application, each bank in a plurality of banks may be split into a plurality of segments. In another embodiment, each segment may include a segment header and a plurality of blocks. In another embodiment, each block in a plurality of blocks may be used as a minimum unit for data read/write. In another embodiment, second storage control module 802 may be also configured to store, in a segment header, a respective part of a mapping from physical block addresses to logical block addresses.

According to embodiments of the present application, operating module 803 may comprise: a write unit configured to, in response to receiving a data write request containing a target logical block address and user data, attach user data to an end of a currently working bank; and a mapping updating unit configured to update a mapping from logical block addresses to physical block addresses and a respective part of the mapping from physical block addresses to logical block addresses. According to embodiments of the present application, operating module 803 may also comprise: an obtaining unit configured to, in response to a currently working bank being full, put the currently working bank in a used bank list, and take out a new bank from the free bank list as a new currently working bank.

According to embodiments of the present application, operating module 803 may comprise a determining unit configured to, in response to receiving a data read request containing a target logical block address, determine a plurality of physical block address ranges corresponding to a target logical block address based on a mapping from logical block addresses to physical block addresses; and a read unit configured to perform a respective data reading for each of a plurality of physical block address ranges.

According to embodiments of the present application, operating module 803 may comprise: a first determining unit configured to, in response to receiving a data write request containing a logical block address and user data, determine a physical block address corresponding to a target logical block address based on a mapping from logical block addresses to physical block addresses; a second determining unit configured to determine a bank corresponding to a physical block address; and a counter updating unit configured to update a counter maintained for the bank.

According to a embodiments of the present application, a operating module 803 may comprise: a third determining unit configured to determine a bank corresponding to a counter with a maximum value; an identifying unit configured to identify valid data blocks and invalid data blocks in a determined bank; and a reading unit configured to read user data in a valid data blocks and a rewriting unit configured to rewrite the read user data into a current bank; and a moving unit configured to move a determined bank into the free bank list.

According to embodiments of the present application, the identifying unit may comprise: a read subunit configured to read segment headers of respective segments included in a determined bank; a translating subunit configured to translate a mapping from physical block addresses to logical block addresses in a segment headers into respective mapping from logical block addresses to physical block addresses; a comparing subunit configured to compare a mapping from logical block addresses to physical block addresses translated for a segment headers with a respective mapping from logical block addresses to physical block addresses in the random access zone, respectively; and an identifying subunit configured to, identify blocks in segments corresponding to segment headers as valid data blocks if a mapping from logical block addresses to physical block addresses translated for the segment headers is identical with a respective mapping from logical block addresses to physical block addresses in a random access zone; and identify the blocks in the segments corresponding to the segment headers as invalid data blocks if the mapping from logical block addresses to physical block addresses translated for the segment headers is not identical with the respective mapping from logical block addresses to physical block addresses in the random access zone.

According to embodiments of the present application, operating module 803 may comprise: a recovering unit configured to recover a mapping from logical block addresses to physical block addresses in a random access zone based on a mapping from physical block addresses to logical block addresses stored in a sequential access zone upon system crash or power failure. According to embodiments of the present application, the recovering unit may comprise: an obtaining subunit configured to, based on write-stamps in segment headers of segments included in the banks and a persisted write-stamp in metadata, obtain a mapping from physical block addresses to logical block addresses included in segment headers corresponding to write-stamps larger than a persisted write-stamp; and a recovering subunit configured to recover a mapping from logical block addresses to physical block addresses in a random access zone based on an obtained mapping from physical block addresses to logical block addresses.

According to embodiments of the present application, the obtaining subunit may comprise: a read subunit configured to read a first segment header and a last segment header in each bank; a determining unit configured to, based on a comparison of write-stamps in the red first segment header and last segment header with a persisted write-stamp in the metadata, determine whether a bank is available for recovering a mapping from logical block addresses to physical block addresses; and an obtaining subunit configured to obtain a mapping from physical block addresses to logical block addresses in a segment header in a bank that is available for recovering the mapping from logical block addresses to the physical block addresses.

The apparatus of operating an SMR device as described above corresponds to processing the method of operating the SMR device as previously mentioned; therefore, specific details may refer to a method of operating an SMR device as previously mentioned, which are thus not detailed here.

Those skilled in the art should understand, that embodiments of the present application may be provided as a method, an apparatus, or a computer program product. Therefore, embodiments of the present application may adopt a pure hardware embodiment, a pure software embodiment or an embodiment combining software and hardware. Moreover, embodiments of the present application may assume a form of a computer program product implemented on one or more computer-usable storage media containing computer-usable program code (including, but not limited to magnetic disk memory, CD-ROM, optical memory, etc.).

In a typical configuration, a computing device comprises one or more processors (CPU), an input/output interface, a network interface, and a memory. The memory may comprise a volatile memory in a computer readable medium, a random access memory (RAM), and/or a non-volatile memory, etc., e.g., a read-only memory (ROM) or a flash memory (flash RAM). The memory is an example of the computer-readable medium.

The computer-readable medium includes non-volatile and volatile, mobile and immobile media, which may carry out information storage in any method or technology. The information may be a computer-readable instruction, a data structure, a program module or other data. examples of the computer storage medium include, but not limited to, phase change RAM (PRAM), static random access memory (SRAM), dynamic random access memory (DRAM), other types of random access memory (RAM), read-only memory (ROM), an electrical erasable programmable read-only memory (EEPROM), a flash memory body or other memory technologies, compact disk read-only memory (CD-ROM), digital video disk (DVD) or other optical storage, cassette tape, tape disk storage or other magnetic storage device or any other non-transmission media, which may be used for storing information that can be accessed by a computing device. According to definitions in the present disclosure, a computer-readable medium does not include a transient computer-readable medium, e.g., modulated data signal and carrier.

What are mentioned above are only embodiments of the present application, and are not intended to limit the scope of the present application. To those skilled in the art, the present application may have various alterations and changes. Any amendments, equivalent substitutions, improvements made within the spirit and principle of the present application should be included within the scope of the claims of the present application.

What is claimed is:

1. A method of operating a shingled magnetic recording device, the device including a random access zone wherein data is randomly readable and writable and a sequential access zone wherein data is only sequentially readable and writable, the sequential access zone being logically split into a plurality of banks operated independent of each other, the method comprising:
    storing a mapping from logical block addresses to physical block addresses in the random access zone;
    storing, in each of the plurality of banks in the sequential access zone, a respective part of a mapping from physical block addresses to logical block addresses; and
    operating the shingled magnetic recording device based on the mapping from logical block addresses to physical block addresses and the mapping from physical block addresses to logical block addresses;

wherein the random access zone further stores metadata for operating the shingled magnetic recording device, the metadata at least comprising one or more from the group consisting of: a free bank list, a used bank list, a plurality of counters maintained for each bank respectively, a next available segment in a current working bank, and a persisted write-stamp.

2. The method according to claim 1, wherein the mapping from logical block addresses to physical block addresses is stored in a buffer for the random access zone.

3. The method according to claim 1, wherein a user data predicted to be modified frequently is directly stored in the random access zone.

4. The method according to claim 1, wherein each of the plurality of banks is split into a plurality of segments, each segment includes a segment header and a plurality of blocks, each of the plurality of blocks is used as a minimum unit for data reading/writing, and wherein the respective part of the mapping from physical block addresses to logical block addresses is stored in the segment header.

5. The method according to claim 4, wherein operating the shingled magnetic recording device comprises:

in response to receiving a data write request containing a logical block address and user data, determining a physical block address corresponding to the target logical block address based on the mapping from logical block addresses to physical block addresses;

determining a bank corresponding to the physical block address; and updating a counter maintained for the bank.

6. The method according to claim 5, wherein operating the shingled magnetic recording device comprises:

determining a bank corresponding to the counter with a maximum value;

identifying valid data blocks and invalid data blocks in the determined bank;

reading a user data in the valid data blocks;

rewriting the user data read from the valid data blocks into a current bank; and moving the determined bank into a free bank list.

7. The method according to claim 6, wherein identifying valid data blocks and invalid data blocks in the determined bank comprises:

reading segment headers of respective segments included in the determined bank;

translating mapping from physical block addresses to logical block addresses in the segment headers into respective mapping from logical block addresses to physical block addresses;

comparing the mapping from logical block addresses to physical block addresses translated for the segment headers with the respective mapping from logical block addresses to physical block addresses in the random access zone, respectively;

identifying the blocks in segments corresponding to the segment headers as valid data blocks if the mapping from logical block addresses to physical block addresses translated for the segment headers is identical with the respective mapping from logical block addresses to physical block addresses in the random access zone; and identifying the blocks in the segments corresponding to the segment headers as invalid data blocks if the mapping from logical block addresses to physical block addresses translated for the segment headers is not identical with the respective mapping from logical block addresses to physical block addresses in the random access zone.

8. The method according to claim 1, wherein operating the shingled magnetic recording device comprises:

in response to receiving a data write request containing a target logical block address and the user data, attaching the user data to an end of a currently working bank; and updating the mapping from logical block addresses to physical block addresses and the respective part of the mapping from physical block addresses to logical block addresses.

9. The method according to claim 8, wherein operating the shingled magnetic recording device further comprises:

in response to the currently working bank being full,
adding the currently working bank into the used bank list, and
selecting a new bank from the free bank list as a new currently working bank.

10. The method according to claim 1, wherein operating the shingled magnetic recording device comprises:

in response to receiving a data read request containing the target logical block address, determining a plurality of physical block address ranges corresponding to the target logical block address based on the mapping from logical block addresses to physical block addresses; and performing respective data reading for each of the plurality of physical block address ranges.

11. The method according to claim 1, wherein operating the shingled magnetic recording device comprises:

recovering the mapping from logical block addresses to physical block addresses in the random access zone based on the mapping from physical block addresses to logical block addresses stored in the sequential access zone upon determination of at least one of a system crash or a power failure.

12. The method according to claim 11, wherein recovering the mapping from logical block addresses to physical block addresses in the random access zone based on the mapping from physical block addresses to logical block addresses stored in the sequential access zone comprises:

obtaining, based on write-stamps in segment headers of respective segments included in the banks and a persisted write-stamp in metadata, the mapping from physical block addresses to logical block addresses included in segment headers corresponding to write-stamps larger than the persisted write-stamp; and recovering the mapping from logical block addresses to physical block addresses in the random access zone based on the obtained mapping from physical block addresses to logical block addresses.

13. The method according to claim 12, wherein obtaining, based on write-stamps in segment headers of respective segments included in the banks and a persisted write-stamp in metadata, the mapping from physical block addresses to logical block addresses included in segment headers corresponding to write-stamps larger than the persisted write-stamp comprises:

reading a first segment header and a last segment header in each bank;

determining, based on a comparison of the write-stamps read in the first segment header and the last segment header with the persisted write-stamp in the metadata, whether the bank is available for recovering the mapping from logical block addresses to physical block addresses; and obtaining the mapping from physical block addresses to logical block addresses in the segment header in the bank that is available for recovering the mapping from logical block addresses to physical block addresses.

14. An apparatus of operating a shingled magnetic recording device, the device including a random access zone wherein data is randomly readable and writable and a sequential access zone wherein data is only sequentially readable and writable, the sequential access zone being logically split into a plurality of banks operated independent of each other, the apparatus configured to:

store a mapping from logical block addresses to physical block addresses in the random access zone;

store, in each of the plurality of banks in the sequential access zone, a respective part of a mapping from physical block addresses to logical block addresses; and operate the shingled magnetic recording device based on the mapping from logical block addresses to physical block addresses and the mapping from physical block addresses to logical block addresses;

in response to receiving a data write request containing a logical block address and the user data, determine a physical block address corresponding to the target logical block address based on the mapping from logical block addresses to physical block addresses;

determine a bank corresponding to the physical block address; and update a counter maintained for the bank.

15. The apparatus according to claim 14, is further configured to:

in response to receiving a data write request containing a target logical block address and a user data, attach the user data to an end of a currently working bank; and update the mapping from logical block addresses to physical block addresses and the respective part of the mapping from physical block addresses to logical block addresses.

16. The apparatus according to claim 14, further configured to:

in response to receiving a data read request containing a target logical block address, determine a plurality of physical block address ranges corresponding to the target logical block address based on the mapping from logical block addresses to physical block addresses; and perform respective data reading for each of the plurality of physical block address ranges.

17. The apparatus according to claim 14, further configured to:

determine a bank corresponding to the counter with a maximum value;

identify valid data blocks and invalid data blocks in the determined bank;

read the user data in the valid data blocks;

rewrite the user data read from the valid blocks into a current bank; and the determined bank into a free bank list.

18. The apparatus according to claim 14, further configured to:

recover the mapping from logical block addresses to physical block addresses in the random access zone based on the mapping from physical block addresses to logical block addresses stored in the sequential access zone upon system crash or power failure.

* * * * *